UNITED STATES PATENT OFFICE.

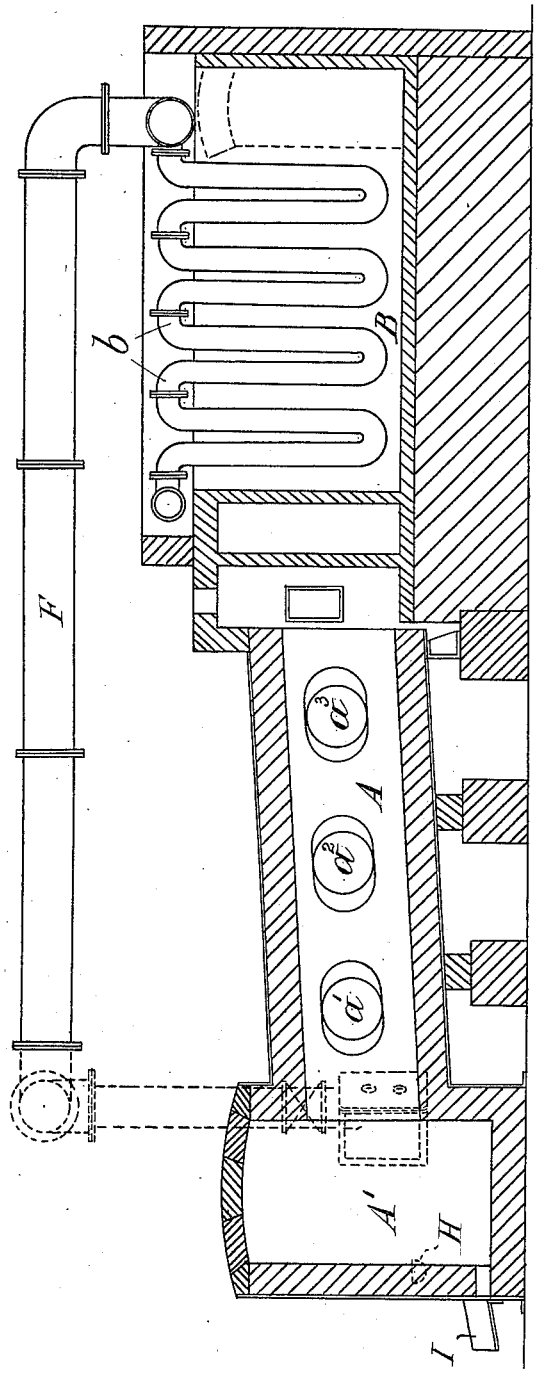

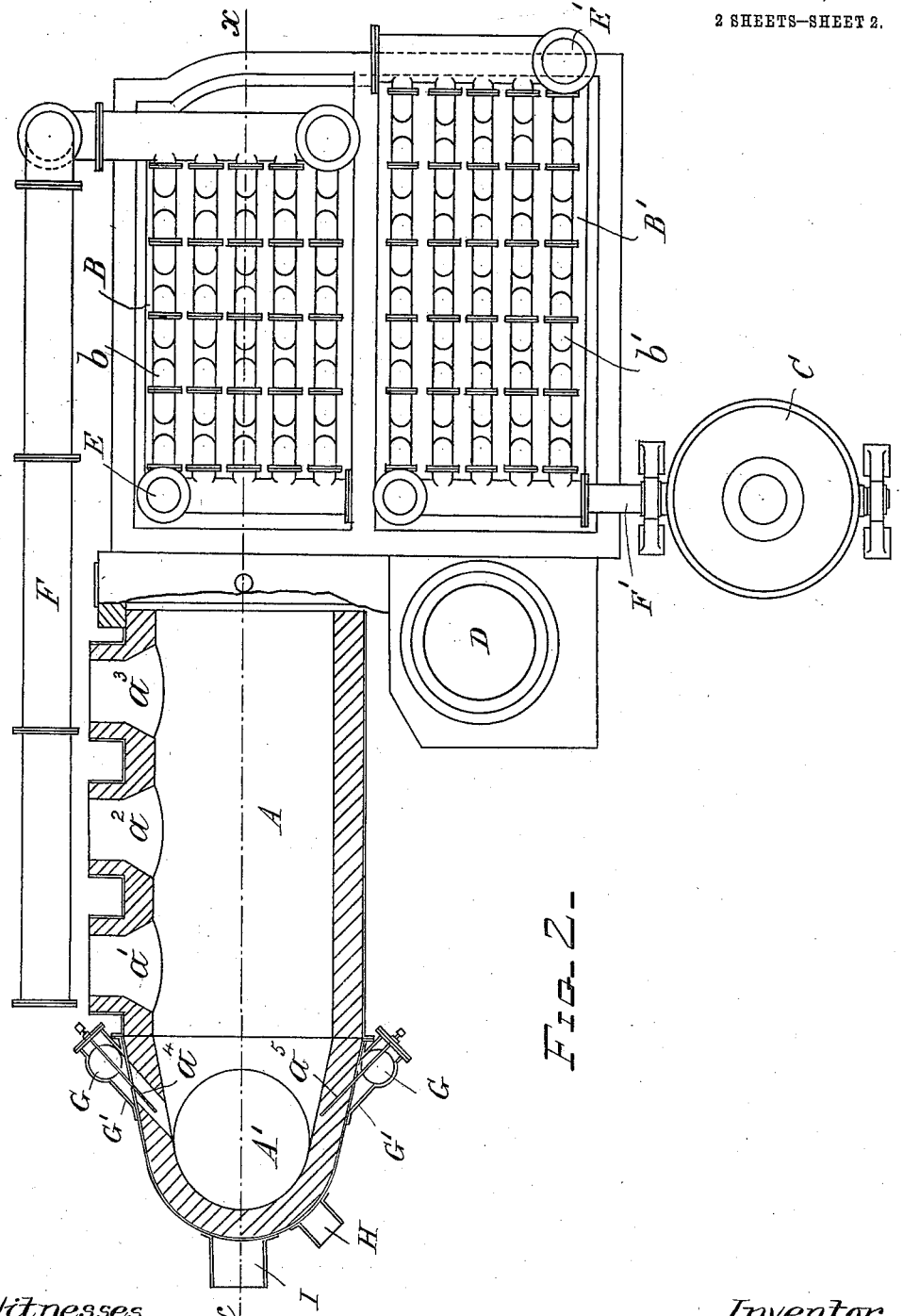

GUY JAMES STOCK, OF DARLINGTON, ENGLAND.

APPARATUS FOR THE MANUFACTURE OF STEEL.

1,004,929.     Specification of Letters Patent.     Patented Oct. 3, 1911.

Application filed May 27, 1911. Serial No. 629,939.

*To all whom it may concern:*

Be it known that I, GUY JAMES STOCK, a subject of the King of Great Britain and Ireland, residing at Darlington, in the county of Durham, England, have invented certain new and useful Improvements in Apparatus for the Manufacture of Steel; and I do hereby declare the following to be a full, clear, and exact description of the invention, such as will enable others skilled in the art to which it appertains to make and use the same.

This invention relates to Bessemer converters in which the materials to be refined, instead of being dealt with in the converter only, as described in the specification of my former Letters Patent No. 935,615, dated 28th September 1909, are first melted in a separate furnace and then refined in the ordinary or well known converter by means of compressed air. The materials are melted in a furnace heated by the combustion of oil, gas, coke or coal, or a mixture of all these, the waste heat from which is recovered in an economizer and utilized to heat the air required for combustion of the necessary fuel for heating and melting the raw materials such as pig iron and scrap in the melting furnace to be used in the converter; also for heating the air required in the converter for converting the molten iron into steel.

The object of my invention is to work the melting furnace continuously and both melting furnace and converter economically by providing that the waste hot gases from such melting furnace shall pass through an economizer built up of pipes or other suitable contrivances by which the waste heat is utilized and transferred to the compressed air used both in the melting furnace and the converter.

In order that suitable apparatus may be provided, erected and operated for the purpose of my invention, I will now proceed to further describe the same, and in doing so shall refer to the accompanying drawing, it being understood that the invention is not restricted to the actual construction or arrangement of the parts or details shown which are to be taken as illustrating what is adapted for conveniently carrying out the process of steel making essentially as hereinbefore set forth.

In the drawing, Figure 1 is a sectional elevation of such an apparatus in its entirety taken on line $x$ $x$ of Fig. 2 which is a corresponding plan view which is partly in section.

A is the melting furnace in which the raw materials such as pig iron and scrap are charged through the doors $a^1$ $a^2$ $a^3$, said furnace communicating with a receiver $A^1$ for collecting the molten metal. In order to heat the furnace oil jets $a^4$ $a^5$ may be employed in conjunction with the requisite supply of air already heated by the waste heat of said combustion which is recovered in an economizer chamber B and utilized to heat the air required for this purpose as well as for carrying out the refining process in the converter C. The economizer B is built up of pipes $b$ $b^1$ or otherwise arranged so that the air passes through long passages in contact with ample surfaces which have absorbed the waste heat received from the melting furnace, which waste heat is thereby transferred to the compressed air to be separately supplied to both the melting furnace A and to converter C. To conveniently effect this the economizer is built up of two sections B and $B^1$ one to provide heated air as required for the melting furnace, the other to provide heated air as required for the converter, which may be of any known type; D being a chimney or uptake for drawing the hot gases through the economizer. Air from the blowing engine is delivered into the economizer at E $E^1$ and passing through the system of pipes $b$ $b^1$ to absorb heat therefrom travels along a pipe F to the melting furnace terminating in a two-way branch pipe leading into the blast boxes G G and through the twyers $G^1$ $G^1$ into the melting furnace receiver $A^1$; the hot air from the economizer B being passed by the pipe $F^1$ through the trunnions of the converter C. The furnace receiver $A^1$ is provided with a slag spout H, and a tapping hole I from which the molten metal is poured into a ladle and conveyed to the converter.

In conclusion I would observe that I am aware that it has been proposed to use a melting furnace and converter in such relation to each other that the waste gases from both are used for the purposes of economy the waste gases from the converter to be used in heating the materials charged into the melting furnace and the waste gases from the melting furnace to be used to heat the air required to carry out the combustion of fuel in the melting furnace, and I effect my proposed economy in conjunction with a continuously worked melting furnace by employing the waste heat from the melting furnace only for heating the air required in both the melting furnace and the converter, and the advantages incidental to my invention are as follows:— Economy in the production of steel and the like due to the continuous working of the melting furnace, in conjunction with the economy effected by the use of hot air derived from the waste gases of said melting furnace, which hot air is utilized in working both melting furnace and converter.

Having fully described my invention, what I claim is:—

In an apparatus of the character described, the combination of a melting furnace, a converter, an economizer built in two sections for heating air by the products of combustion from the melting furnace, and means for using the heated air from one of said sections in the melting furnace and from the other in the converter, substantially as described.

In testimony whereof, I affix my signature, in presence of two witnesses.

GUY JAMES STOCK.

Witnesses:
H. S. BURN,
J. O. FLETCHER.

Copies of this patent may be obtained for five cents each, by addressing the "Commissioner of Patents, Washington, D. C."